US006171063B1

United States Patent
Namai et al.

(10) Patent No.: US 6,171,063 B1
(45) Date of Patent: Jan. 9, 2001

(54) CONTROL CIRCUIT FOR VIBRATING COMPRESSORS FOR PROTECTING AGAINST EXCESSIVE VOLTAGE AND TEMPERATURE

(75) Inventors: Masao Namai; Naoki Akazawa, both of Nitta-machi (JP)

(73) Assignee: Sawafuji Electric Co., Ltd. (JP)

(*) Notice: Under 35 U.S.C. 154(b), the term of this patent shall be extended for 0 days.

(21) Appl. No.: 09/126,258

(22) Filed: Jul. 30, 1998

(30) Foreign Application Priority Data

Jul. 31, 1997 (JP) .................................................... 9-205778

(51) Int. Cl.[7] .................................................... F04B 31/00
(52) U.S. Cl. .................................. 417/11; 417/32; 417/45
(58) Field of Search .................................. 417/11, 12, 32, 417/45, 44.11

(56) References Cited

U.S. PATENT DOCUMENTS

| 4,277,710 | * | 7/1981 | Harwood et al. | 310/316 |
|---|---|---|---|---|
| 4,283,920 | * | 8/1981 | Kainuma et al. | 62/126 |
| 4,706,470 | * | 11/1987 | Akazawa et al. | 62/209 |
| 4,736,595 | * | 4/1988 | Kato | 62/160 |
| 4,833,358 | * | 5/1989 | Suzuki et al. | 310/316 |
| 4,952,834 | * | 8/1990 | Okada | 310/316 |
| 5,072,354 | * | 12/1991 | Katto et al. | 363/41 |
| 5,209,075 | * | 5/1993 | Kim | 62/126 |
| 5,280,228 | * | 1/1994 | Kanouda et al. | 318/803 |
| 5,436,819 | * | 7/1995 | Mikami et al. | 363/41 |
| 5,656,896 | * | 8/1997 | Ogiwara et al. | 318/114 |
| 5,658,132 | * | 8/1997 | Akazawa et al. | 417/45 |
| 5,742,492 | * | 4/1998 | Akazawa et al. | 363/26 |

* cited by examiner

*Primary Examiner*—Timothy S. Thorpe
*Assistant Examiner*—Robert Z. Evora
(74) *Attorney, Agent, or Firm*—McGlew and Tuttle, P.C.

(57) ABSTRACT

A control circuit for vibrating compressors for converting d-c voltage into a-c voltage to supply a-c voltage to a vibrating compressor (1) comprising a MOS-FET transistor (2) for driving the vibrating compressor (1), a timer IC for generating pulses to switch the MOS-FET transistor (2), a timer forced operation circuit for forcibly reversing the output of the timer IC at a timing at which a counter-electromotive voltage generated by the vibrating compressor (1) during the OFF period of the MOS-FET transistor (2) is restored in the vicinity of 0 volts, a driver for driving the MOS-FET transistor (2) based on the output of the timer IC, and a pulse width changing circuit (9) for detecting an input voltage input into the vibrating compressor (1) and lowering the input voltage to the vibrating compressor (1) by changing the pulse width of output pulses of the timer IC when the input voltage is higher than a predetermined voltage.

3 Claims, 5 Drawing Sheets

CONTROL CIRCUIT FOR VIBRATING COMPRESSORS FOR PROTECTING AGAINST EXCESSIVE VOLTAGE AND TEMPERATURE

FIELD OF THE INVENTION

This invention relates generally to a control circuit for vibrating compressors, and more specifically to a control circuit for vibrating compressors having a vibrating drive coil in a magnetic field, which protects the vibrating compressor when an overrun of the vibrating compressor piston might cause a damage to the valve by generating an a-c voltage of a reduced voltage level to prevent the valve from being damaged.

BACKGROUND OF THE INVENTION

Conventional types of control circuit for vibrating compressors are such that the d-c voltage of a battery, etc. is converted into an a-c voltage, which is applied to the vibrating compressor. In converting a d-c voltage into an a-c voltage, an a-c voltage of a frequency agreeing with the mechanical vibration of the vibrating compressor is generated and applied to the vibrating compressor.

Conventional types of control circuit for vibrating compressors have heretofore used a circuit configuration in which a switching element, such as a MOS-FET transistor, converts the d-c voltage of a battery into an a-c voltage, which is in turn applied directly to the vibrating compressor.

For this reason, the battery voltage during or immediately after the charging of the battery is normally higher than the predetermined voltage, and accordingly the converted a-c voltage of a frequency agreeing with the mechanical vibration of the vibrating compressor also tends to be higher, causing or threatening to cause a damage to the valve due to the overrun of the vibrating compressor piston.

If the ambient temperature of the vibrating compressor drops, the delivery pressure of the vibrating compressor also drops, causing the stroke of the vibrating compressor piston to increase. As a result, when the ambient temperature of the vibrating compressor is lower than a predetermined temperature, a damage is caused or threatens to be caused to the valve due to the overrun of the vibrating compressor piston even when a predetermined voltage is applied to the vibrating compressor.

SUMMARY OF THE INVENTION

To overcome the aforementioned problems, it is an object of this invention to protect the valve of a vibrating compressor from being damaged due to the overrun of the vibrating compressor piston by providing a control circuit that converts a d-c voltage into an a-c voltage to supply to the vibrating compressor.

It is another object of this invention to protect the valve of a vibrating compressor from being damaged due to the overrun of the vibrating compressor piston by providing a control circuit that detects an input voltage to be input into the vibrating compressor at a timing at which the voltage is restored to a level close to 0 volts, and reduces the input voltage when the input voltage is higher than a predetermined voltage.

It is a further object of this invention to protect the valve of a vibrating compressor from being damaged due to the overrun of the vibrating compressor piston by providing a control circuit that detects the ambient temperature of the vibrating compressor instead of detecting a high input voltage to the vibrating compressor, or simultaneously with the detection of a high input voltage, and reduces the input voltage when the ambient temperature is lower than a predetermined temperature.

It is still a further object of this invention to protect a MOS-FET transistor due to the malfunction of a control circuit by providing a capacitor on the gate of the MOS-FET transistor to cut d-c components.

DETAILED DESCRIPTION OF PREFERRED EMBODIMENTS

Figure 1:
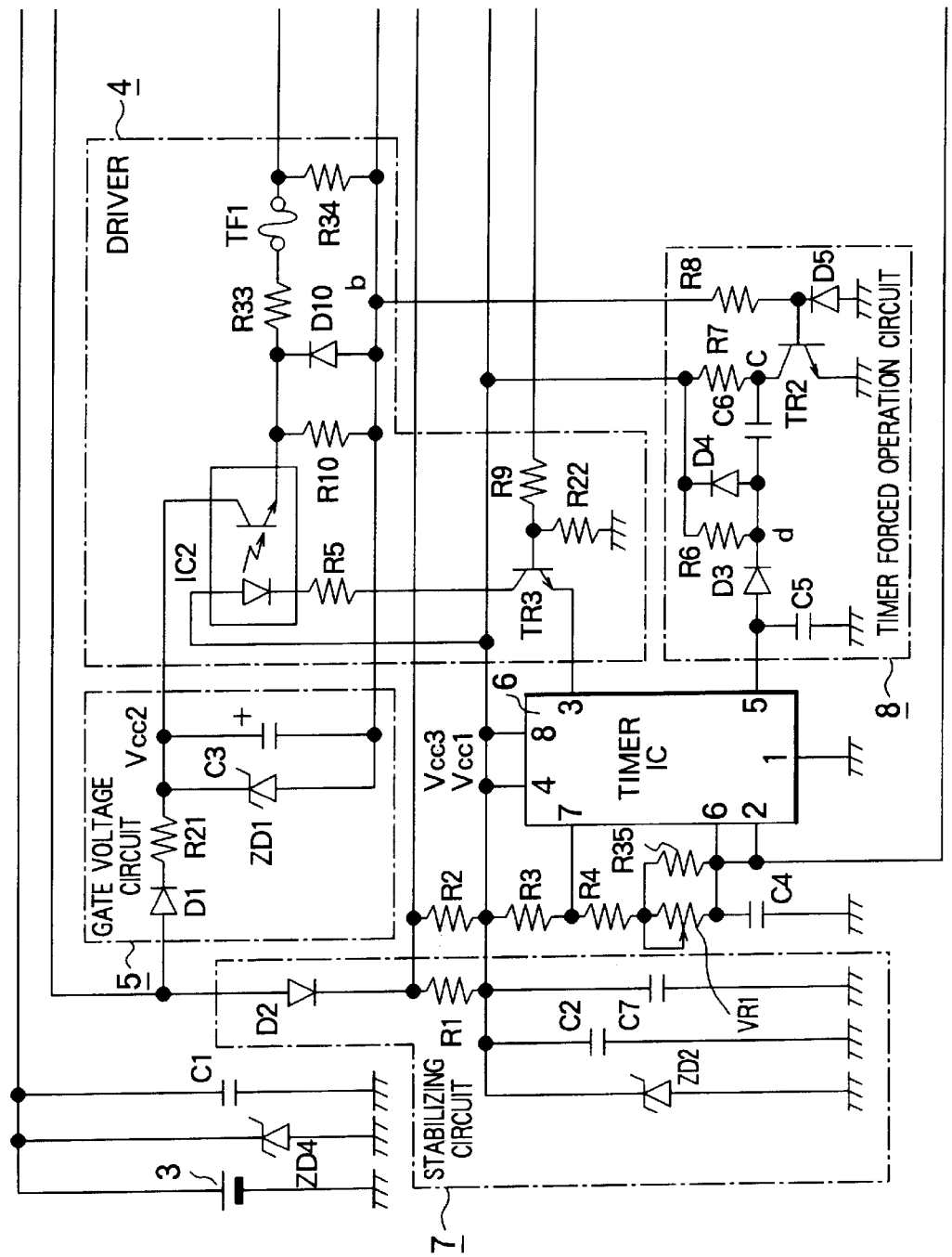
FIG. 1 is a partial circuit diagram of a control circuit for vibrating compressors embodying this invention.
Figure 2:
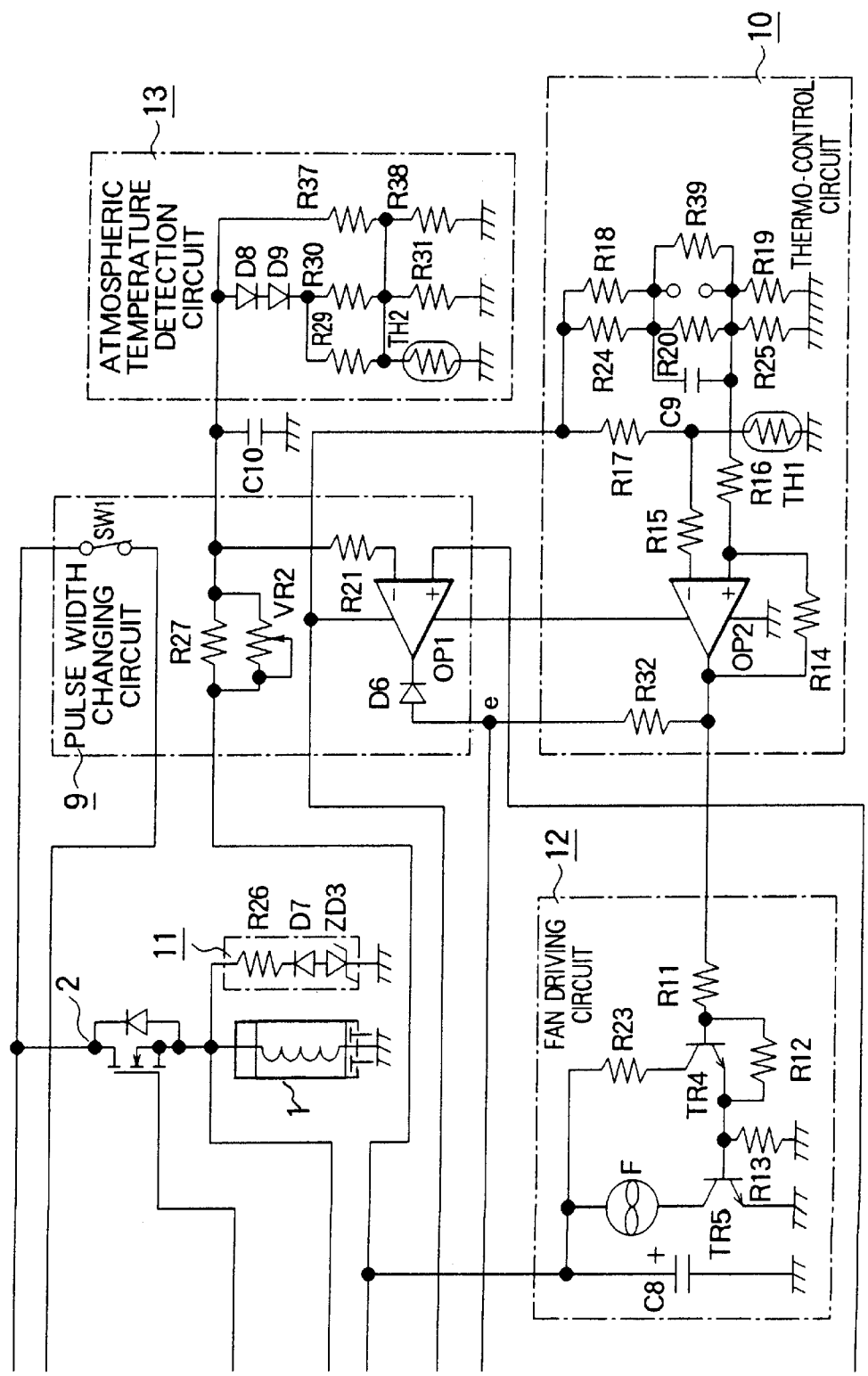
FIG. 2 is a partial circuit diagram of a control circuit for vibrating compressors embodying this invention, the left side of which is connected to the right side of FIG. 1 to form the overall circuit.

In FIGS. 1 and 2, a vibrating compressor 1 is connected between the source of a MOS-FET transistor 2 and the earth, and the drain of the MOS-FET transistor 2 is connected to +12V (description hereinafter is based on the voltage of the battery 3 of 12 volts). The gate of the MOS-FET transistor 2 is connected to a driver 4, to which a gate voltage circuit 5 is connected. An approx. 12-V voltage Vcc2 is fed to the driver 4 from the gate voltage circuit 5.

Upon receiving a pulse signal output by a timer IC 6 (NE555, for example), the driver 4 generates a gate signal to the MOS-FET transistor 2 based on the received pulse signal. A +7.5-V power voltage Vcc1 is fed from a stabilizing circuit 7 to the timer IC 6. The timer IC 6 operates as an astable multivibrator, and the ON-OFF time of its output, which is determined by resistors R3, R4 and R35, variable resistor VR1, and a capacitor C4 connected to the pins nos. 6 and 7 of the timer IC 6, as shown in the figure, is usually expressed by ON time T1=0.693(R3+RX)·C4 and OFF time T2=0.693·RX·C4, where RX is a combined resistance of the resistor R4 and R35, and the variable resistor VR1.

A timer forced-operation circuit 8 is connected to the pin no. 5 of the timer IC 6, and forcibly turns on the OFF output on the pin no. 3 at a given timing, as will be described later.

A pulse width changing circuit 9 for preventing the valve 20 from being damaged due to the overrun of the piston 21 of the vibrating compressor 1, and a thermo-control circuit 10 for keeping the temperature in the refrigerator at a constant level are provided in connection with the driver 4. An ambient temperature detection circuit 13 for detecting the ambient temperature of the vibrating compressor 1 is subordinated to the pulse width changing circuit 9. Numeral 11 refers to a counter-electromotive voltage clamp circuit for clamping the counter-electromotive voltage generated in the vibrating compressor 1, and 12 to a fan driving circuit for agitating the cool air in the refrigerator.

In the pulse width changing circuit 9, the switch SW1 is kept turned on.

The operation of the control circuit for vibrating compressors according to this invention having the aforementioned construction will be described in the following.

Figure 4:
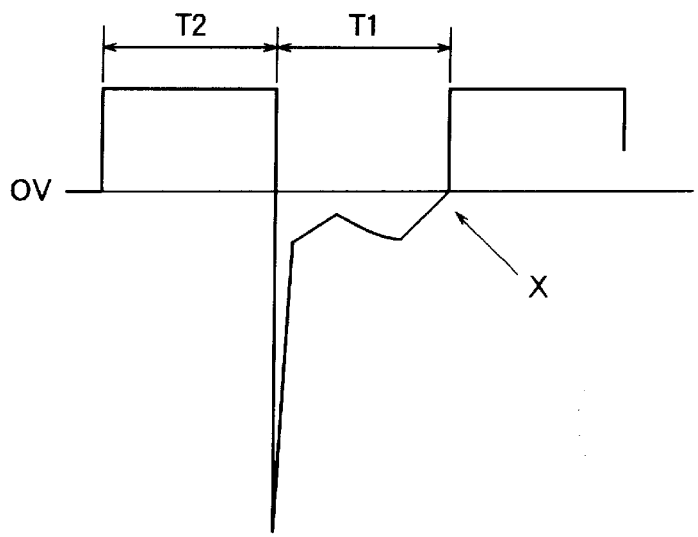
FIG. 4 is a diagram of assistance in explaining the counter electromotive voltage generated in the vibrating compressor.

Since the MOS-FET transistor 2 is a source follower, an approx. 12-V power voltage Vcc2, which is based on the source, is prepared as a signal to be applied between the gate and source, after stabilized by the gate voltage circuit 5. That is, when the MOS-FET transistor 2 is turned off, a counter-electromotive voltage as shown in FIG. 4 is generated on the source of the MOS-FET transistor 2 by the inductance of the vibrating compressor 1. With this, a diode D1 is conducting, charging a capacitor C3, maintaining the power voltage Vcc2. At this time, the power voltage Vcc2 is maintained at approximately 12 volts by a constant-voltage diode ZD1.

Now, the operation will be described, referring to FIG. 3, a time chart of assistance in explaining the operation of this invention.

When the output on the pin no. 3 of the timer IC 6 becomes L (FIG. 3 ①), a phototransistor in a photocoupler IC2 (TLP521, for example) is turned on via a transistor TR3 that is usually kept turned on, and the approx. 12-V voltage Vcc2 is applied to the gate of the MOS-FET transistor 2 (FIG. 3 ②), causing the MOS-FET transistor 2 to turn on. As a result, the voltage of the battery 3 is applied to the vibrating compressor 1 (FIG. 3 ③). The optimum time for voltage application to the vibrating compressor 1 is empirically determined by the construction of the vibrating compressor 1, and set to the aforementioned OFF time T2.

After the lapse of this OFF time T2, the output on the pin no. 3 of the timer IC 6 becomes H (FIG. 3 ①), causing the MOS-FET transistor 2 to turn off. At this moment, a counter-electromotive voltage having a heavily negative voltage is produced, as shown in FIG. 4, by the inductance of the vibrating compressor 1 (FIG. 3 ③). This counter-electromotive voltage is gradually restored and about to exceed 0 volts. The time for the counter-electromotive voltage to reach this zero-cross point (point X in FIG. 4) varies with pressure and temperature conditions of the vibrating compressor 1. It is empirically known that the best efficiency is accomplished by applying the next pulse at point X in FIG. 4. At this timing, therefore, the timer forced-operation circuit 8 is operated, and the output of the timer IC 6 is forcibly reversed from H to L, that is, from the ON time T1 to the OFF time T2 at the timing when the counter-electromotive voltage is about to exceed 0 volts.

Since the source of the MOS-FET transistor 2 is kept at negative potential by the aforementioned counter-electromotive voltage while the MOS-FET transistor 2 is turned off (FIG. 3 ③), the base of the transistor TR2 in the timer forced-operation circuit 8 is reverse-biased, causing the transistor TR2 to be turned off. As the counter-electromotive voltage is restored and the source of the MOS-FET transistor 2 is about to exceed 0 volts, the transistor TR2 is turned on at that timing, and the point c on the collector side is reversed from H to L (FIG. 3 ⑤). The change of the point c on the collector side from H to L is differentiated by a differentiation circuit comprising a resistor R6 and a capacitor C6, and as a result, the trigger waveform shown in FIG. 3 ⑥ appears on the point d on the cathode side of the diode D3. Note that the trigger waveform shown by dotted lines, which appears when the transistor TR2 is turned off and the point c on the collector side is changed from L to H, disappears as it is clamped to Vcc1 by the diode D4.

The aforementioned trigger waveform differentiated by the differentiation circuit comprising the resistor R6 and the capacitor C6 is entered to the pin number 5 of the timer IC 6 through the diode D3. The pin number 5 of the timer IC 6 serves as a control input for the ON time T1 to be output from the pin number 3; the voltage input to the pin number 5 is compared with the charging voltage of the capacitor C4 on the pin number 6 to effect control so that the output on the pin number 3 is reversed when the voltage on the pin number 5 is lower than the voltage on the pin number 6. The voltage on the pin number 5 is normally set to ⅔ of the power voltage, Vcc, a level higher than the charging voltage of the capacitor C4 to be input to the pin number 6 (FIG. 3 ⑦). As shown in FIG. 3 ⑦, however, as the trigger waveform is entered, the voltage on the pin number 6 becomes lower than the charging voltage of the capacitor C4 on the pin number 6 before it reaches ⅔ of Vcc, and as a result is triggered. Thus, the output on the pin number 3 is forcibly reversed at this timing from H to L, that is, the ON time T1 on the pin number 3 is forcibly terminated, and the OFF time T2 is initiated (FIG. 3 ①).

Although the OFF time T2 becomes shorter than T2=0.693·RX·C4, as described above, because the OFF time T2 begins with a voltage lower than ⅔ of Vcc, the OFF time T2 is kept almost constant. The value of OFF time T2 according to this invention is determined, taking into account that the OFF time T2 becomes shorter than T2=0.693·RX·C4.

Figure 3:
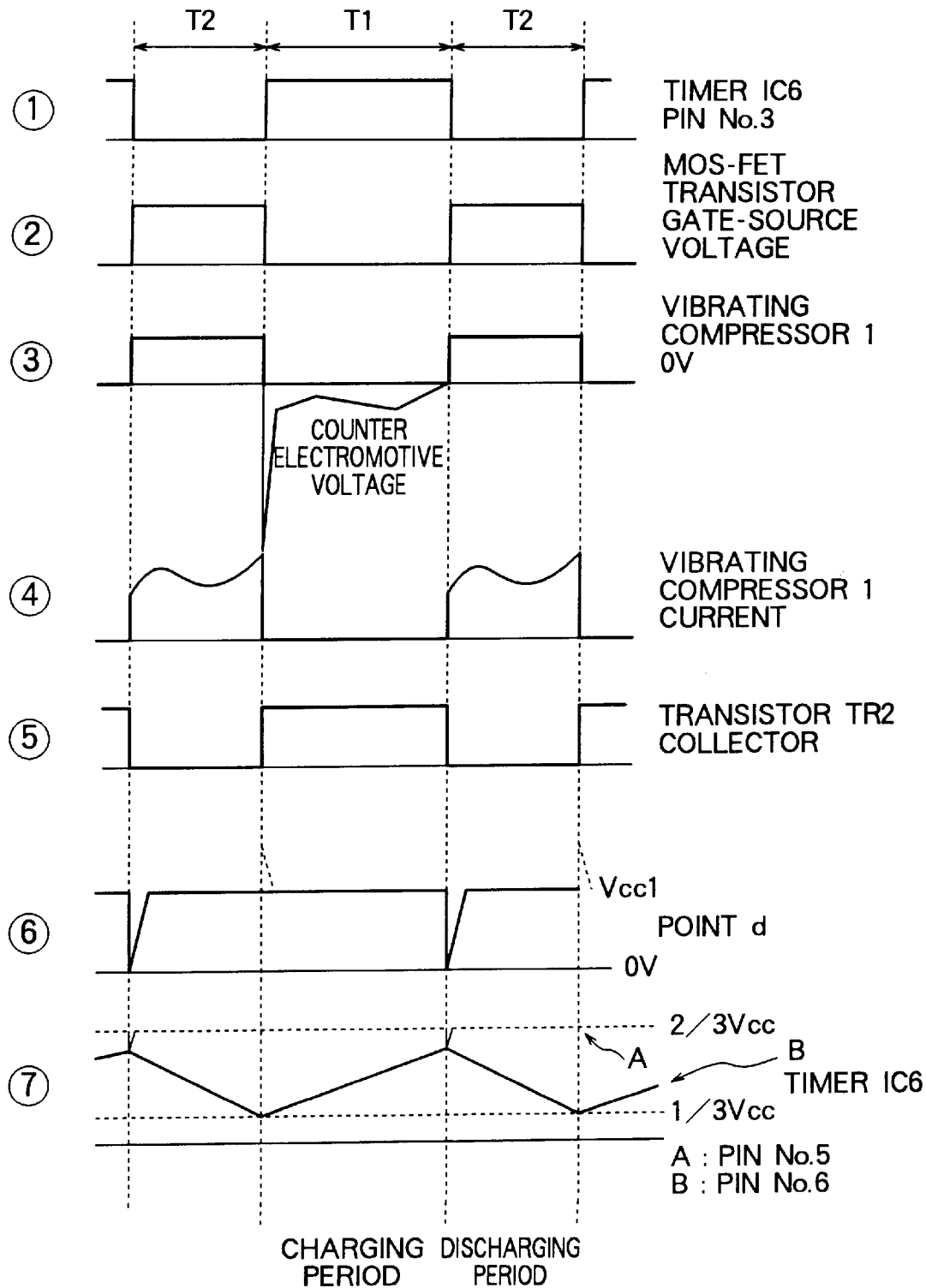
FIG. 3 is a time chart of assistance in explaining the operation of this invention.

The levels of ⅓ Vcc and ⅔ Vcc in FIG. 3 ⑦ represent the levels at which the ON time and the OFF time are initiated on the pin number 3 when the pin number 5 of the time IC 6 is not used, and the charging voltage of the capacitor C4 on the pin number 6 reaches any of the levels.

The OP amplifier OP1 of the pulse width changing circuit 9 compares the charging voltage of the capacitor C4 to be input to the pin number 6 of the timer IC 6 with the partial voltage obtained by dividing the voltage of the battery 3 detected as a voltage Vcc3 with the combined resistance of the parallel-connected resistors R27 and VR2, and the combined resistance of the ambient temperature detection circuit 13. When the voltage of the battery 3 is lower than a predetermined voltage, the partial voltage is lower than the ever-changing charging voltage of the capacitor C4, the output of the OP amplifier OP1 is kept at H, and the diode D6 is turned off. In other words, the point e on the anode side of the diode D6 is normally kept at H by the output of the thermo-control circuit 10, which will be described later. Consequently, the transistor TR3 of the driver 4 is controlled to the ON state, and a pulse signal output by the timer IC 6 is entered to the photocoupler IC2. As a result, a corresponding pulse signal is output from the photocoupler IC2, and the ON-OFF control of the MOS-FET transistor 2 is carried out. Upon application of the voltage obtained by the ON-OFF control, that is, the switching control of the MOS-FET transistor 2, the vibrating compressor 1 is put into the running state.

Figure 5:
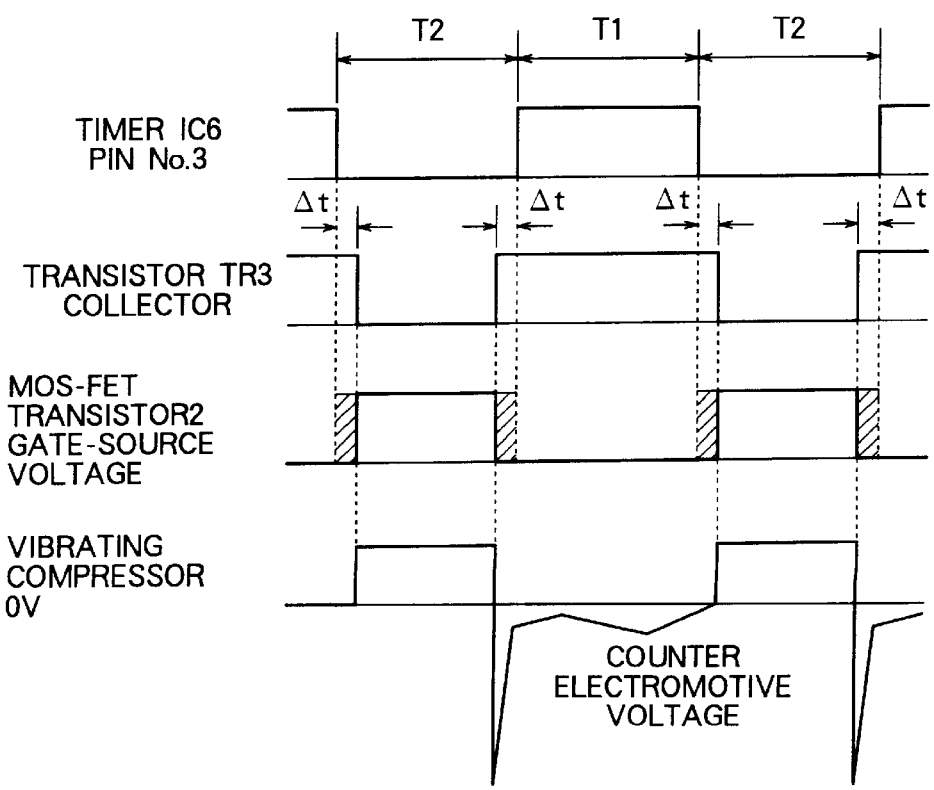
FIG. 5 is a diagram of assistance in explaining the operation of a pulse width changing circuit.

If the voltage of the battery 3 exceeds a predetermined voltage as encountered during charging of the battery 3 or immediately after charging, the partial voltage obtained by dividing the voltage of the battery 3, which is detected as the voltage Vcc3, with the combined resistance of the parallel-connected resistors R27 and VR2 and the combined resistance of the ambient temperature detection circuit 13 becomes larger that the charging voltage of the capacitor C4 input to the pin number 6 of the timer IC 6, causing the output of the OP amplifier OP1 to change to L. Thus, the diode D6 is turned on, causing the point e on the anode side of the diode D6 to change to L. As a result, the transistor TR3 is turned off, and the collector of the transistor TR3 is controlled as shown by solid lines in FIG. 5 with respect to the pulse output from the pin number 3 of the timer IC 6. With the operation of the transistor TR3, the pulse width of the base voltage that turns on the MOS-FET transistor 2, that is, the input pulse width between the gate and the source of the MOS-FET transistor 2 is reduced by 2Δt, as shown in FIG. 5 (shaded portion). As a result, the voltage applied to the vibrating compressor 1 is reduced, and the stroke of the piston of the compressor is also reduced, preventing the damage to the valve 20 due to the overrun of the piston 21.

As ambient temperature is lowered, the resistance value of the thermistor TH2 in the ambient temperature detection circuit 13 is increased. As the thermistor TH2 for detecting the ambient temperature in the refrigerator detects a drop in the refrigerator ambient temperature, the combined resistor of the ambient temperature control circuit 13 rises.

As the ambient temperature in the refrigerator falls below a predetermined temperature, the combined resistance of the ambient temperature detection circuit 13 is increased due to the increase in the resistance value of the thermistor TH2. As a result, the partial voltage obtained by dividing the voltage of the battery 3 detected as the voltage Vcc3 with the combined resistance of the parallel-connected resistors R27 and VR2 and the combined resistance of the ambient temperature detection circuit 13 becomes larger than the charging voltage on the pin number 6 of the timer IC 6, and the OP amplifier OP1 outputs L.

As the ambient temperature in the refrigerator falls below a predetermined temperature, therefore, a control similar to that for the case when the voltage of the battery 3 exceeds a predetermined voltage, as described above, is carried out, causing the voltage applied to the vibrating compressor I to lower despite the fact that a predetermined voltage is applied to the vibrating compressor 1. As the ambient temperature falls, on the other hand, the delivery pressure of the vibrating compressor 1 is lowered. An overrun of the piston 21 hardly takes place due to the drop in the voltage applied. Thus, the piston 21 of the vibrating compressor 1 is prevented from unwantedly interfering with the valve 20.

The OP amplifier OP2 of the thermo-control circuit 10 always compares the voltage obtained by dividing the resistor R17 and the thermistor TH1 with the reference voltage obtained by dividing the voltage Vcc1 stabilized by the stabilization circuit 7 with the combined resistance of two pairs of the parallel-connected resistors R18 and R24, and R20 and R39, and the combined resistance of a pair of parallel-connected resistors R19 and R25. Since the resistance value of the thermistor TH1 rises as the temperature lowers, the output of the OP amplifier OP2 changes to L as the ambient temperature in the refrigerator falls below a predetermined temperature. Regardless of the state of output of the OP amplifier OP1 in the pulse width changing circuit 9, the base of the transistor TR3 is reduced to zero, and the transistor TR3 is turned off. This suspends the light emission of the diode in the photocoupler IC2, turning off the MOS-FET transistor 2. As the temperature in the refrigerator rises, the output of the OP C amplifier OP2 is reversed to H. If the output of the OP amplifier OP1 is in H, the MOS-FET transistor 2 is controlled to the ON state by the pulse signal output by the timer IC 6. As a result, the vibrating compressor 1 resumes operation.

The fan drive circuit 12 for agitating the cool air in the refrigerator causes the fan F to rotate as its transistor TR5 is turned on when the base current for turning on the transistor TR4 flows, that is, when both the output of the OP amplifier OP1 in the pulse width changing circuit 9 and the output of the OP amplifier OP2 in the thermo-control circuit 10 are in H.

Figure 6:
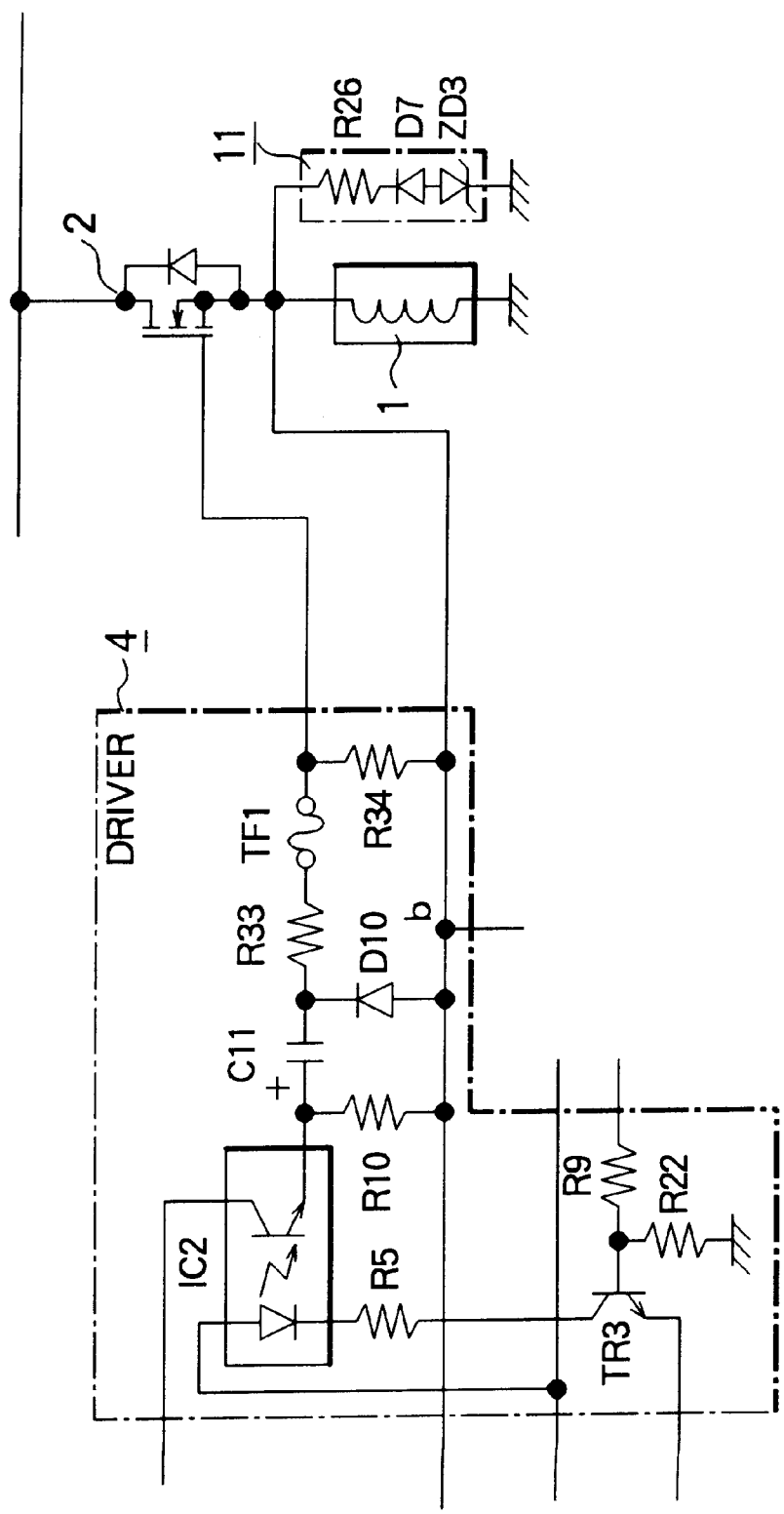
FIG. 6 is a circuit diagram of another driver used in this invention.

FIG. 6 shows another circuit diagram of a driver used in this invention.

The driver 4 shown in FIG. 6 is different from the driver 4 shown in FIG. 1 in that a capacitor 11 for cutting d-c components is added between the resistor R10 and the diode D10.

When the control circuit of the vibrating compressor malfunctions due to water drops, for example, and a voltage having a certain level other than a pulse waveform is output from the photocoupler IC2, the MOS-FET transistor 2 keeps the ON state, resulting in failure in extreme cases. In such a case, the capacitor C11 cuts d-c components, preventing the MOS-FET transistor 2 to keep the ON state and protecting the MOS-FET transistor 2 from being damaged due to malfunction.

As described above, this invention detects the input voltage and the ambient temperature in the refrigerator, and reduces the voltage applied to the vibrating compressor when the input voltage is high or the ambient temperature is low. Thus, the vibrating compressor 1 is protected from damage to the valve 20 due to the overrun of the piston 21 when the input voltage is high or the ambient temperature is low.

By using a capacitor for cutting d-c components, the MOS-FET transistor is protected from being damaged due to malfunction.

What is claimed is:

1. A control circuit for vibrating compressors for converting d-c voltage into ac voltage to supply a-c voltage to a vibrating compressor comprising
   a MOS-FET transistor for driving said vibrating compressor,
   a timer IC for generating pulses to switch said MOS-FET transistor,
   a timer forced-operation circuit for forcibly reversing the output of said timer IC at a timing at which a counter-electromotive voltage generated by said vibrating compressor during the OFF period of said MOS-FET transistor is restored in the vicinity of 0 volts,
   a driver for driving said MOS-FET transistor based on the output, of said timer IC, said driver including a capacitor for cutting d-c components in a gate of said MOS-FET transistor so that said MOS-FET transistor is protected from damage due to malfunction of said control circuit, and
   a pulse width changing circuit for detecting an input voltage input into said vibrating compressor and lowering said input voltage to said vibrating compressor by changing the pulse width of output pulses of said timer IC when said input voltage is higher than a predetermined voltage which would cause damage to a valve of the vibrating compresor due to an overrun of a piston of the vibrating compressor.

2. A control circuit for vibrating compressors for converting d-c voltage into a-c voltage to supply ac voltage to a vibrating compressor comprising
   a MOS-FET transistor for driving said vibrating compressor,
   a timer IC for generating pulses to switch said MOS-FET transistor,
   a timer forced-operation circuit for forcibly reversing the output of said timer IC at a timing at which a counter-electromotive voltage generated by said vibrating compressor during the OFF period of said MOS-FET transistor is restored in the vicinity of 0 volts, a driver for driving said MOS-FET transistor based on the output of said timer IC, said driver including a capacitor for cutting d-c components in a gate of said MOS-FET transistor so that said MOS-FET transistor is protected from damage due to malfunction of said control circuit, and a pulse width changing circuit for detecting ambient temperature around said vibrating compressor and lowering an input voltage to said vibrating compressor by changing the pulse width of output pulses of said timer IC when said ambient temperature is lower than a predetermined temperature which would cause damage to a valve of the vibrating compressor due to an overrun of a piston of the vibrating compressor.

3. A vibrating compressor control circuit for converting d-c voltage into ac voltage and suppling the a-c voltage to a vibrating compressor, the control circuit comprising:

a transistor for driving the vibrating compressor with on and off periods;

a timer for generating pulses to switch said transistor between said on and off periods;

a timer forced-operation circuit for forcibly reversing a state of one of said pulses of said timer IC at a point where a counter-electromotive voltage generated by the vibrating compressor during one of said off periods has substantially expired;

a pulse width changing circuit for detecting an input voltage supplied to said vibrating compressor and lowering an input power to said vibrating compressor by changing a pulse width of said pulses of said timer when said input voltage is higher than a predetermined voltage which would overrun a piston of the vibrating compressor and damage a valve of the vibrating compressor;

a driver for driving said transistor based on said pulses from said timer, driver including a capacitor for cutting d-c components in a gate of said transistor to protect said transistor from damage due to a malfunction of the control circuit.

* * * * *